United States Patent [19]

Close

[11] 4,447,478
[45] May 8, 1984

[54] NOVEL FLUOROELASTOMER FILM COMPOSITIONS AND METHOD FOR THE PREPARATION THEREOF

[75] Inventor: Donald Close, Stow, Ohio

[73] Assignee: David Hudson, Inc., Stow, Ohio

[21] Appl. No.: 383,343

[22] Filed: May 28, 1982

Related U.S. Application Data

[62] Division of Ser. No. 178,895, Aug. 18, 1980, abandoned.

[51] Int. Cl.$^3$ ............................................... B05D 3/02
[52] U.S. Cl. .............................. 427/407.1; 427/407.2; 427/407.3; 427/408; 427/409; 427/410; 427/411; 427/412
[58] Field of Search ................... 427/386, 385.5, 393.5, 427/391, 392, 389.7, 389.8, 388.2, 388.1, 389.9, 407.1, 407.2, 407.3, 408, 409, 410–412

[56] References Cited

U.S. PATENT DOCUMENTS

| | | | |
|---|---|---|---|
| 2,793,200 | 5/1957 | West | 260/87.7 |
| 2,904,528 | 9/1959 | Honn | 260/45.5 |
| 2,968,649 | 1/1961 | Pailthorp et al. | 260/80.5 |
| 2,970,988 | 2/1961 | Lo | 260/87.7 |
| 2,979,418 | 4/1961 | Dipner | 117/72 |
| 2,979,490 | 4/1961 | West | 260/87.5 |
| 3,029,227 | 4/1962 | Robb | 260/77.5 |
| 3,039,992 | 6/1962 | Smith | 260/45.7 |
| 3,041,316 | 6/1962 | Griffin | 260/79 |
| 3,340,222 | 9/1967 | Fang | 260/41 |
| 3,674,763 | 7/1972 | Nakamura et al. | 260/87.7 |
| 3,884,877 | 5/1975 | Kolb | 260/80.77 |
| 4,143,204 | 3/1979 | Fang | 428/413 |

FOREIGN PATENT DOCUMENTS

1228438 7/1968 United Kingdom .

OTHER PUBLICATIONS

Bowman, "Solution Coatings of Viton" (duPont VITON Bulletin No. 16, 1966).
Hackett, "Adhering 'Viton' to Metal During Vulcanization" duPont VITON Report VT–450.1.
Alexander, "A Capsule View of the A, B and E Types of 'VITON'" duPont VITON Report VT–000.1 (R2).
Arnold, Barney and Thompson, *Rubber Chemistry and Technology*, "Fluoroelastomers" 619–653.

*Primary Examiner*—Thurman K. Page
*Attorney, Agent, or Firm*—Renner, Kenner, Greive & Bobak

[57] ABSTRACT

The invention herein disclosed provides a method for preparing improved fluoroelastomer film compositions including the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding an amine-derived curative to the gum solution and curing the fluoroelastomer gum with the curative in the absence of metallic oxides. A method is also provided for adhering fluoroelastomer film compositions, devoid of metallic oxides, to substrates which includes the steps of dissolving the fluoroelastomer gum in a solvent, adding an amine-derived curative to the gum solution, coating the substrate with the fluoroelastomer gum-curative solution and evaporating the solvent leaving a film firmly adhered to the substrate. When metallic oxides are present, the foregoing method can also be practiced by including the step of adding an epoxy resin to the composition. The fluoroelastomer film compositions disclosed herein are also novel and can be used to coat a variety of substrates thereby providing other novel, useful articles.

5 Claims, No Drawings

NOVEL FLUOROELASTOMER FILM COMPOSITIONS AND METHOD FOR THE PREPARATION THEREOF

This application is a division of application Ser. No. 178,895 now abandoned, filed Aug. 18, 1980.

TECHNICAL FIELD

The present invention is directed toward novel fluoroelastomer film compositions, which compositions exhibit greatly improved adhesion with a variety of substrate materials. A method for preparing the fluoroelastomer films and for improving the adhesion between these films and various substrates is also set forth as are a plurality of useful articles bearing a coating or envelope of the fluoroelastomer film compositions of the present invention.

Fluorocarbon elastomers comprise copolymers of vinylidene fluoride and hexafluoropropylene, known since about 1956, and terpolymers of vinylidene fluoride, hexafluoropropylene and tetrafluoroethylene, known since about 1958. Generally, these compositions exhibit a resistance to heat, aliphatic and aromatic hydrocarbons, chlorinated solvents, petroleum fluids and many mineral acids. Although not universally resistant to solvents or chemicals, their resistance to such compounds is superior to most other elastomers. They can be processed with existing technology and apparatus into solid or solid walled articles, however, given their relatively high cost, use of fluoroelastomers has been somewhat curtailed and directed more to specialty applications.

BACKGROUND ART

Known fluoroelastomer compositions comprise the fluorocarbon elastomer or gum, a metal oxide, a filler, curing agents and processing aids. Converting the rubbery raw gum fluoroelastomer to vulcanizates requires primary crosslinking or curing agents such as the amines, dithiols, peroxides or certain aromatic polyhydroxy compounds. Alternatively, radiation can be used. With each of these systems a basic metal oxide is required, such as the oxides of magnesium, calcium, lead or zinc, as an acid acceptor. Fillers are employed for their usual purposes those being to reinforce the elastomer and reduce cost. Processing aids are also employed for conventional purposes.

To compound a fluoroelastomer for coating purposes, it is customary to mix the gum with a desired filler and a metallic oxide on a mill, working the additives well into the gum. After removal from the mill, a solvent such as a low molecular weight ester or ketone is added followed by an aliphatic amine. The amine initiates curing which requires that the composition be utilized within several hours.

In another curing system, a ketimine is added to the foregoing mill mix with the solvent. The resulting mixture is relatively stable so long as moisture is not present. Ketimines are also utilized to cure epoxy resins and in the presence of moisture from the air or otherwise, break down to form an amine and a ketone. Once the amine has been released, the fluoroelastomer begins to cure, providing a working life of several hours.

Yet another system includes the addition of the curative with the gum, filler and metallic oxide on the mill. Curatives such as hexamethylene diamine carbamate, ethylene diamine carbamate or dicinnamylidene-1,6-hexanediamine, commonly referred to as the DIAK's, are used. Care must be exercised that the temperature on the mill does not rise too high in order to avoid premature curing. The resulting mixture can then be processed on conventional apparatus or it can be mixed with a solvent to be used for coating work. Heat completes the final cure in this system as it also does with the preceding systems.

When used as a coating, several problems exist. A primary one is adhesion; pretreatmnt of the substrate is required including cleaning and priming operations. Another problem is that settling of the metallic oxide will occur during use of the coating material, giving a nonuniform dispersion of the metallic oxide and nonuniform cure. Working life is usually relatively low requiring the manufacturer to compound the fluoroelastomer and use it the same day, often within hours. Use of ketimines, for instance, necessitates airless spraying and closed dipping tank systems in order to avoid premature curing prior to the application. Where solvents are not employed, for production of solid products, mill mixing rarely results in homogeneous mixtures of the metallic oxide and curative such as DIAK, throughout the gum.

The foregoing fluoroelastomer systems typify the state of the art and although the compositions have been utilized to form solid products as well as coated products, use as a coating has had its shortcomings. Coatings obviously provide a fluoroelastomer surface without the expense of the entire article being a fluoroelastomer. In other instances, where size, strength or location of the article militates against solid elastomer construction, a coating is the only manner in which the fluoroelastomer can be employed.

Of the systems and techniques known to me, none has provided a composition readily adherable to a plurality of substrates, providing an abrasion resistant coating and without loss of the inherent chemical resistance possessed by the fluoroelastomer. Ideally, a thinner film, on the order of one or more mils (0.025 mm) thickness, that could adhere to a variety of substrates or envelop them, would enable fluoroelastomers to be used in applications where heretofore they have been unfit due either to high costs or poor adhesion.

DISCLOSURE OF THE INVENTION

It is therefore an object of the present invention to provide a novel fluoroelastomer film composition that adheres well to a variety of substrates such as plastics, rubbers, metals, glass, fabrics, fiberglass, wood, paper and the like, is relatively abrasion free and provides a good protection against chemical, fuel and solvent attack.

It is another object of the present invention to provide a method for preparing improved fluoroelastomer film compositions.

It is yet another object of the present invention to provide a method for adhering fluoroelastomer film compositions to substrates.

It is a further object of the present invention to provide a novel fluoroelastomer film composition, as described hereinabove, that is devoid of metallic oxides.

It is still a further object of the present invention to provide methods, as described hereinabove, that do not require the step of milling or otherwise physically adding metallic oxides to the fluoroelastomer composition.

It is still another object of the present invention to provide methods, as described hereinabove, which employ amine-derived compounds to cure the fluoroelastomer.

It is yet another object of the present invention to provide novel articles coated with or enveloped by the fluoroelastomer film composition of the present invention.

These and other objects, together with the advantages thereof over the prior art, which shall become apparent from the specification which follows are accomplished by my invention as hereinafter described and claimed.

In general, the method for preparing improved fluoroelastomer film compositions according to the present invention includes the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding an amine-derived curative to the gum solution and curing the fluoroelastomer gum with the curative in the absence of metallic oxides. A method is also provided for adhering fluoroelastomer film compositions, devoid of metallic oxides, to substrates which includes the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding an amine-derived curative to the gum solution, coating the substrate with the fluoroelastomer gum-curative solution and evaporating the solvent, leaving a film firmly adhered to the substrate.

Adhesion between a fluoroelastomer and a substrate can also be provided by another method of the present invention which includes the steps of coating a substrate with an amide adduct of an epoxy with or without an amidoamine, dissolving the fluoroelastomer gum in a solvent, applying the fluoroelastomer gum solution to the coated substrate, evaporating the solvent and leaving a film firmly adhered to the curative coated substrate. Any of the foregoing methods can optionally include the step of baking, following evaporation of the solvent. Baking generally hastens the evaporation process also, but more importantly, it can improve properties of the cured films.

Lastly, the present invention provides for a novel fluoroelastomer cured film composition which is dense and impermeable and is prepared by the step of curing a fluoroelastomer gum with an amine-derived curvative in the absence of metallic oxides or, if a metallic oxide is present, the step will include the addition of an epoxy resin. Epoxy resins can also be added to the fluoroelastomer composition during the foregoing methods and can be employed whether the composition contains metallic oxides or not; in either instance, good adhesion is obtained between the fluoroelastomer film coating and various substrates.

The methods of the present invention principally allow a fluoroelastomer composition, as a film coating, to adhere to a variety of substrates which they have not adhered to well, if at all, heretofore. The film coatings can be cured with conventional curing agents which are known curatives for fluoroelastomers, epoxies and other polymers. Unlike existing systems, however, the methods of the present invention are directed toward deleting metallic oxides from the composition and, by so doing, it has been found that adhesion to substrates is greatly improved. Alternatively, where metallic oxides are desired, and adhesion is necessary, epoxy resins can be added and again, a dramatic increase in adhesion will be observed. The preferred embodiments which follow shall establish the increase in adhesive properties utilizing a majority of the types of commonly employed curatives. Comparisons with controls utilizing these same curatives will demonstrate the lack of adhesion which characterizes existing technology.

PREFERRED MODE FOR CARRYING OUT THE INVENTION

Fluorocarbon elastomers utilized in the practice of the present invention include the copolymers of vinylidene fluoride and hexafluoropropylene and the terpolymers of vinylidene fluoride, hexafluoropropylene and tetrafluoroethylene. Fluorocarbon elastomers such as those are commercially available as the Viton brand and Fluorel brand fluoroelastomers. Viton is a registered trademark of E. I. duPont de Nemours & Co. and Fluorel is a registered trademark of 3M Company. Experimental work conducted and reported herein has been with the Viton series specifically including two of the polymers listed in Table I.

TABLE I

| | |
|---|---|
| Viton A | Copolymer of vinylidene fluoride and hexafluoropropylene |
| Viton A-35 | Low viscosity analog of Viton A |
| Viton B | Terpolymer of vinylidene fluoride, hexafluoropropylene and tetrafluoroethylene |
| Viton B-50 | Low viscosity analog of Viton B |
| Viton E-60 | Copolymer of vinylidene fluoride and hexafluoropropylene with broad molecular weight distribution |
| Viton C-10 | Very low viscosity version of Viton A |
| Viton VTR-5362 | A terpolymer of proprietary composition |

Although not exemplified herein, the present invention could as well be practiced with the other Viton elastomers or the Fluorel elastomers available from 3M.

Compositions of the present invention comprise a fluoroelastomer gum and a curative, preferably those derived from an amine. The composition may additionally contain the epoxy group, but in neither instance are metallic oxides necessary. In order to demonstrate practice of the present invention different Viton series polymers have been employed and while not every example has been repeated with each of the seven polymers presented in Table I, it is to be understood that substitutions of one particular polymer for another can be made by those skilled in the art according to the properties characterizing a specific series which properties are desired in the invention composition.

An important aspect of the present invention is that the inherent resistance of the fluorocarbon elastomers to many fuels, hydrocarbons and solvents is not sacrificed to gain the improved adhesion set forth herein. On the contrary, the usefulness of the fluorocarbon elastomers comprising the invention composition will be seen to increase, due to the adhesive properties imparted to the latter. Inasmuch as existing fluorocarbon elastomer compositions have not adhered well, if at all, to very many substrates, the compositions and method set forth herein will provide the ability to coat or envelope these substrates for the first time, providing new and useful products.

The curative compounds that are added herein fall into several groups each characterized by having or being derived from the amine, —NH₂ group. One such class of compounds includes ketone-blocked polyamines also referred to as the ketimines which are formed by the reaction of aliphatic polyamines such as diethylenetriamine and simple aliphatic ketones such as methylethyl ketone. These compounds are well known in the art providing room temperature cures of fluoroelastomers and epoxy resins. The curing mechanism involves release of the polyamine constituent in the presence of moisture such as from the atmosphere.

Exemplary commercial ketimines that have been employed herein include Epon Curing Agents H-2 and H-3 from Shell Chemical Company. Epon is a registered trademark of Shell Chemical Company. Although the exact chemical formula of these agents is not available, technical literature from the supplier indicates that the equivalent weight, defined as the grams of curing agent which, when completely reacted with water, will provide one gramequivalent of amine hydrogen, is as follows: Epon H-2=55; Epon H-3=101. Available polyamine content, i.e., the amount of reactive polyamine released when the curing agent is completely reacted with water, is 27 and 60 percent by weight for these agents, respectively.

Another commercially available ketimine that has been successfully employed herein is Modified Amine A-100 from Henkel Corporation, Resins Division. A-100 is described as tetrafunctional ketimine blocked by methyl isobutyl ketone, it has a functionality of approximately 4 and an equivalent weight of about 275. During reaction, approximately 30 percent by weight of volatile ketone is released.

The amount of ketimine employed is from about 0.1 to about 15.0 parts by weight based upon 100 parts of the fluoroelastomer, hereinafter abbreviated phr. The foregoing range is an operable range; experimental work herein has indicated the optimal ranges for each curative falls within the broader range and that generally, as the amount of curative is decreased, adhesion of the fluoroelastomer composition to various substrates increases.

Another class of compounds that can be employed herein are the aliphatic amines. Most commonly available and useful is triethylenetetramine or TETA. Others that could be employed would include diethylenetriamine, iminobispropylamine, bis(hexamethylene)triamine, tetraethylenepentamine, pentaethylenehexamine, aminoethanolamine, dimethylaminopropylamine, diethylaminopropylamine and the like. Amounts of the aliphatic amines added range from about 0.1 to 1.0 phr.

Resinous amidopolyamines, commonly referred to in the trade as fatty polyamides, can also be employed. Fatty polyamides utilized as curing agents are generally derived from dimerized linoleic acid and ethylenediamine or diethylenetriamine. Other derivations include from acid-terminated polyesters; from acetoacetic esters, the resultant amide being hydrogenated; from dimerized soybean-oil fatty acid; from condensation products of unsaturated fatty acids with dicyclopentadiene; from fatty acids which have been reacted with carbon monoxide and water to produce carboxyl groups at the double bonds; from ethylene glycol, adipic acid, and ethanolamine, and mixtures of polymeric fatty acids and dimerized rosin.

Particularly useful are the Versamid series which are reactive polyamide resins known to copolymerize with epoxy resins. Versamid is a registered trademark of General Mills Inc. Although the exact chemical formula of these resins is not available, technical literature establishes the properties listed in Table II.

TABLE II

Commercial Polyamide Resins

| | Description | Brookfield Viscosity | Amine Value |
|---|---|---|---|
| Versamid 100 | Semi-solid | 7–12 poises @ 150° C. | 85–95 |
| Versamid 115 | Fluid | 31–38 poises @ 75° C. | 230–246 |
| Versamid 125 | Fluid | 7–9 poises @ 75° C. | 330–360 |
| Versamid 140 | Fluid | 2.5–4.5 poises @ 75° C. | 370–400 |

The preferred amount of polyamide resin employed ranges from about 0.5 to about 4 phr. However, the amounts employed can be greater but with a corresponding decrease in pot life. In instances where the fluoroelastomer composition of the present invention is to be used immediately after preparation and/or where a relatively short cure time may be desired, amounts greater than 4 phr can be added. Also the longer chain Versamids are less reactive. Versamid 100 has a very long chain, providing a pot life of about one month. Versamid 140 has a short chain, providing a pot life of only several hours. Therefore, working life can also be controlled by selection of the resin.

It is also possible to incorporate epoxy groups in the composition of the present invention along with the amine-derived curative. One manner of doing this is by employing a polyamide adduct. Two such curatives found to be operable are available from Henkel Corporation as 230XB60 which is Versamid 115 and a solid epoxy resin and 280B75 which is Versamid 140 and a liquid epoxy resin. Another polyamine adduct curative is D.E.H. 52 which is an adduct of D.E.R. 331 epoxy resin and TETA. D.E.H. and D.E.R. are registered trademarks of The Dow Chemical Co., the former for polyamines and polyamides suitable for curing epoxy resins and the latter for a series of epoxy resins. The amount of polyamide adduct employed ranges from about 1.0 to 4.0 phr.

In some instances, it may be desirable to add a fatty amidoamine resin with the polyamide adduct. As will be reported hereinbelow, work with Viton 5362 and a polyamide adduct tended to produce gassing which was significantly lessened when a fatty amidoamine resin was present.

One particularly useful compound is Genamid 2000, a reactive fatty amidoamine resin of relatively low viscosity designed for use with liquid or solid epoxy resins, Genamid being a registered trademark of General Mills Inc. Although the exact chemical formula of this resin is not available, technical literature establishes its amine value as 580 to 620 and its Brookfield Viscosity as 10–25 poises at 25° C. The amount of amidoamine employed, when mixed with a polyamide adduct, ranges from about 1.0 to about 4.0 phr.

Another manner of incorporating epoxy groups involves the addition of liquid or solid epoxies to the fluoroelastomer gum. While experimental work established that the already improved adhesion exhibited by the other fluoroelastomer coatings of the present invention was not further improved when an epoxy resin was added, the epoxy resin does significantly improve adhesion in fluoroelastomer compositions containing metallic oxides and fillers. The latter compositions, containing metallic oxides but no epoxy resins, have been utilized as controls hereinbelow and will be shown to provide little or no adhesion to the substrates tested.

Epoxy resins that could be employed are all widely known and commercially available and include solid, liquid and novalac resins. Work conducted herein involved the use of EPON Resin 828, a liquid epoxy, low molecular weight (average 380) resin, of the epichlorohydrin/bisphenol A type having a Kinematic viscosity of 100-160 poises at 25° C. and an epoxide equivalent of 185-192, the latter term being the grams of resin containing one gram-equivalent of epoxide. EPON resin 1001, a solid epoxy resin of the epichlorohydrin/bisphenol A type having an average molecular weight of about 900, a Gardner-Holdt viscosity of 1.0 to 1.7 poise at 25° C. and an epoxide equivalent of 450-550 was also utilized. Amounts of the epoxy resin added range from about 1 to 100 phr with 1 to 20 phr being preferred. When an epoxy is added, the amount of curative employed is determined by the amount required to cure the fluoroelastomer and the epoxy. EPON is a registered trademark of Shell Chemical Company.

Preparation of the composition according to the method of the present invention requires first that the fluoroelastomer be put into solution with a typical solvent such as methylethyl ketone (MEK), acetone, ethyl acetate, tetrahydrofuran and the like. Next is added the curative and epoxy, when the latter is desired, also as a solution in one of the foregoing solvents. Most components are mixed for a period of time of from about five to about 15 minutes at room temperature and then applied to the desired substrate. Those systems that begin to cure as soon as they are combined are two-part systems which can only be mixed immediately prior to use. Others, such as the ketimine systems which require atmospheric moisture can be mixed together forming a one-part systems, having a stable shelf life of as long as several months.

After evaporation of the solvent, as well as to shorten the period of evaporation, the film can be baked. Suitable baking temperatures range from about 100° C. to 149° C. with corresponding times of two hours to about one hour. Purpose of baking is more important than evaporation of the solvent. In many instances it will optimize properties of the films such as adhesion, impermeability, surface texture and film toughness. Insofar as it aids curing, baked films will tend to be more abrasion resistant and have lower elongations. Generally, baking helps adhesion to aluminum substrates the most.

It is important to note that the composition of the present invention does not require the presence of metallic oxides. In fact, for satisfactory adhesion to various substrates better results are obtained when the metallic oxide is omitted. Deletion of the metallic oxide from the composition of the present invention is clearly contrary to the present understanding of the art which teaches that the metallic oxide is necessary to provide acid acceptors in the curing reaction.

With respect to fillers, such as carbon black or mineral fillers, generally their presence or absence from the composition does not appear to affect the improved adhesive properties. However, in a few instances presence of a filler, such as carbon black, has been found to result in a film having less adhesion to a substrate, in which case it should be omitted from the composition. Inasmuch as the composition of the present invention does not require a filler for improved adhesion, where a filler is not otherwise desired, it should be omitted.

The fluoroelastomer composition prepared according to the foregoing process can be used to form coatings, envelopes around other articles, films and the like. When used as a coating or envelope, the underlying support material or substrate is given the protection inherent fluoroelastomers. Moreover, the coating or envelope is generally abrasion resistant and most importantly has a very high degree of adhesion to many substrates which in itself is a major advantage of the present invention.

Fluoroelastomer compositions of the present invention, cured in the absence of metallic oxides, have been tested by coating metal including aluminum, steel, tin and brass, glass, paper, cardboard, fiberglass, wood, asbestos board, cork, numerous fabrics, EPDM rubber, selected nitriles, urethanes, ethylene vinyl acetates, phenolics, epoxies, selected latex rubbers, selected polyvinyl chlorides and various foam materials. The solution of the composition can be poured onto or over the substrate. The substrate can be coated via brush, roller, dip, spray or other known techniques for applying solvent coatings. The coated articles have been subjected to a variety of tests to determine the adhesion between fluoroelastomer and substrate and the resistance of the fluoroelastomer to various environments. A more detailed explanation regarding testig is provided with the examples hereinbelow.

EXAMPLES

In the first series of examples, Viton 5362 and Viton B were employed with different ketimine or aliphatic amine curatives. In each instance, the Viton gum was first put into solution with methylethyl ketone to form a 20% solution by weight unless otherwise noted. The curative was next put into methylethyl ketone solution at 20% by weight. Respective amounts of the fluoroelastomer and curative solutions mixed together have been set forth in Table III, all parts being listed by weight including the solvent. Given 20% total solids contents for the solutions, the phr of curative employed is the same number as appears in the table. Two DuPont formulations were also prepared, as Control A and B, which were utilized in adhesion, gasohol immersion tests and acid environment tests for comparison with the compositions of the present invention. Neither control formulation constitutes the invention claimed herein but rather is to be taken as the state of existing fluoroelastomer technology. The formulation of each is contained in Table IV; all parts being phr.

TABLE III

| | Formulation of Viton Compositions with Amine Curatives | | | | | |
|---|---|---|---|---|---|---|
| Ex. No. | Viton 5362 | Viton B | A-100 | H-2 | H-3 | TETA |
| 1 | 100 | — | 1.5 | — | — | — |
| 2 | 100 | — | 3 | — | — | — |
| 3 | — | 100 | 3 | — | — | — |
| 4 | 100 | — | 0.3 | — | — | — |
| 5 | 100 | — | — | 1 | — | — |
| 6 | 100 | — | — | — | 2 | — |
| 7 | 100 | — | 5 | — | — | — |
| 8 | 100$^a$ | — | — | — | — | 0.6$^b$ |
| 9 | 100 | — | — | — | — | 0.1 |
| 10 | 100 | — | — | — | — | 0.1 |
| 11 | 100 | — | — | 1 | — | — |
| 12 | 100 | — | — | 0.1 | — | — |
| 13 | 100 | — | — | — | 2 | — |
| 14 | 100 | — | — | — | 0.2 | — |
| 15 | 100 | — | 5 | — | — | — |
| 16 | 100 | — | 0.5 | — | — | — |
| 17 | 100 | — | — | — | — | 0.1 |
| 18 | 100 | — | — | — | — | 1 |
| 19 | — | 100 | — | — | — | 0.1 |

TABLE III-continued

Formulation of Viton Compositions with Amine Curatives

| Ex. No. | Viton 5362 | Viton B | A-100 | H-2 | H-3 | TETA |
|---------|-----------|---------|-------|-----|-----|------|
| 20 | — | 100 | — | — | — | 1 |

[a] Additional MEK added to give 10% total solids for fluoroelastomer and to allow coating to be sprayed
[b] 20% curative solution employed

TABLE IV

Viton B Control Compositions

| Control | Viton B | Maglite Y[a] | MT Black[b] | DIAK #3[c] | TETA | MEK |
|---------|---------|--------------|-------------|------------|------|-----|
| A | 100[d] | 15 | 15 | 2 | — | 528 |
| B | 100 | 15 | 20 | — | 1 | 540 |

[a] Registered trademark for light magnesium oxide, by Merck & Co., Inc.
[b] Carbon black filler
[c] N,N'—dicinnamylidene-1,6-hexanediamine
[d] Viton B-50 used, low viscosity analog of Viton B In the tests which are reported hereinbelow, a determination of excellent adhesion was made when the film could only be scraped from the substrate with great difficulty with destruction rather than removal of the film. Good adhesion was determined when the film could only be peeled away with difficulty and although scraping was not necessary, the film would stretch beyond its elastic limit and tear. Anything less would readily pull away from the substrate which was poor and unsatisfactory adhesion.

Examples 1-4 were poured onto aluminum, steel and tin plates. After the solvent evaporated, a coating remained which was difficult to remove from the metal. Control A was tested in the same manner and readily pulled away from the metal. Example 4 was used to coat a sheet of EPDM rubber which was then baked for one hour at about 149° C. Adhesion was found to be very good.

Next, 4.5 mil coatings on aluminum were formed by pouring 2 gms of the liquid of Examples 1-5 into an aluminum weighing dish, evaporating the solvent and baking for one hour at 149° C. The Example 4 and Control A specimens were then totally immersed in a jar of gasohol and sealed. Two weeks later, the dishes were removed and the film coatings examined. The control film was bubbled and had separated from the dish evidencing no adhesion. Example 4 provided very good adhesion and film integrity. Examples 1-3 were not immersed in gasohol but all adhered well to the aluminum dish.

Examples 5-7 were mixed in a jar which was tightly covered and put aside to observe for gelling. Gel times ranged from four to 20 days. Inasmuch as the solvent had picked up some moisture, Example 5 was repeated with fresh solvent. In the same gelling test it was still fluid after four months. Shelf life could be further improved by using dried solvent.

Example 8 was used to coat aluminum, glass and EPDM. The coated substrates were then baked for one hour at 120° C. Adhesion of the films to the substrates was excellent. Example 8 was then poured into an aluminum dish to form a 4.5 mil coating, following which a total gasohol immersion test was conducted as described hereinabove. Adhesion was found to be fair and no blisters were observed although some film softening had occurred.

For Example 9, all of the ingredients were combined and mixed overnight on a roller mill in an attempt to have the TETA link all of the Viton chains without building a crosslink network. It was believed that such a compound would exhibit less shrinking with longer chains. Adhesion to glass (slides) and aluminum after baking was found to be excellent. Following gasohol immersion for two weeks, the quality of the film on the aluminum was good, although it could be peeled away; film on the glass was excellent as was the adhesion.

Example 10 was prepared as Examples 1-8, without overnight mixing. The film, baked onto a glass slide and an aluminum weighing dish, was immersed in gasohol for two weeks. There was no evidence of gasohol penetration for either specimen; film quality and adhesion were good to aluminum and excellent to glass. Example 10 and Control B, coated on aluminum dishes were also tested in a nitric acid environment. The environment was created by resting the dish within a glass jar, placing several drops of concentrated nitric acid on the coating and sealing the jar with a polyethylene lid. The coating was thus subjected to liquid and vapor acid environments. After eight days the control film was blistered whereas the film from Example 10 was no different after four weeks despite repeated additions of nitric acid to make up for evaporation. Unprotected surfaces in both samples were badly corroded by the acid.

Examples 11-18 were used to coat glass slides with a dip coater, dipping at a rate 1.0 cm/minute. All specimens were baked for one hour at 160° C. Each of the films had excellent adhesion to the glass.

Examples 19 and 20 were prepared with Viton B, cast into aluminum weighing dishes, baked and tested in the acid-jar apparatus described hereinabove with both nitric and sulfuric acid. In the nitric acid, the Control B film blistered in eight days, while the films from Examples 19 and 20 were intact after four weeks of observation. All three films were intact in the sulfuric acid environment after four weeks of observation.

Based upon the preceding results, effective curing agent levels were established as reported in Table IV. Inasmuch as unreacted amines are subject to chemical attack in cured films, it is believed that the curative level should be low so as to minimize attack and subsequent loss of adhesion. Effective amounts of each of the three ketimine curatives are as follows: A-100, 0.5 to 5.0 phr; H-2, 0.1 to 1.0 phr; H-3, 0.2 to 2.0 phr. However, higher amounts can be used as discussed hereinabove.

In the next series of tests, Viton 5362 and Viton B were again employed and, as before, were dissolved in MEK to form a 20% concentration by weight of the gum. The curatives selected were polyamides, specifically Versamid 100, 115, 125 and 140 each of which was also added as a 20% solution in MEK. Amounts of the curative added are presented in Table V. Gel times were also determined and have been listed in Table V. A separate control, C, was formulated as before according to DuPont specifications. With the exception of the substitution of 0.5 phr of H-3 as a curative, for 1 phr of TETA, Control C is otherwise identical to Control B.

TABLE V

Formulations of Viton Compound with Polyamides

| Ex. No. | Viton 5362 | Viton B | Versamid 100 | 115 | 125 | 140 | Gel Time (days) |
|---------|-----------|---------|-----|-----|-----|-----|------|
| 21 | 100 | — | 4 | — | — | — | >14 |
| 22 | 100 | — | 8 | — | — | — | >14 |
| 23 | 100 | — | 16 | — | — | — | >14 |
| 24 | 100 | — | 24 | — | — | — | >14 |

TABLE V-continued

Formulations of Viton Compound with Polyamides

| Ex. No. | Viton 5362 | Viton B | Versamid 100 | Versamid 115 | Versamid 125 | Versamid 140 | Gel Time (days) |
|---------|------------|---------|--------------|--------------|--------------|--------------|-----------------|
| 25 | 100 | — | — | 4 | — | — | 5 |
| 26 | 100 | — | — | 8 | — | — | 5 hrs. |
| 27 | 100 | — | — | 16 | — | — | 2 hrs. |
| 28 | 100 | — | — | — | 2 | — | >20 |
| 29 | 100 | — | — | — | 4 | — | 1 |
| 30 | 100 | — | — | — | 8 | — | 4 hrs. |
| 31 | 100 | — | — | — | — | 2 | 20 |
| 32 | 100 | — | — | — | — | 4 | 7 hrs. |
| 33 | 100 | — | — | — | — | 8 | 3 hrs. |
| 34 | — | 100 | — | — | 6 | — | >3 hrs. |
| 35 | — | 100 | — | — | — | 6 | 2 hrs. |

Examples 21–24 were used to coat aluminum tin plate, steel, EPDM and glass forming films generally less than about five mils thick. Each sample was baked for one hour at 149° C. All four examples exhibited excellent adhesion to the aluminum and good adhesion to the other four substrates. Good adhesion was established when the film could only be removed by peeling or scraping with difficulty. The Control C film exhibited fair to no adhesion to the substrates. Example 21 and Control C were baked on aluminum weighing dishes, as described hereinabove, and immersed in gasohol for two weeks. Neither film was able to adhere to the dish, however, the Control film was bubbled while Example 21 was not.

Adhesion was determined for the remaining Examples 25–33 with aluminum, steel tin plate, EPDM and glass as previously discussed, the results of which appear in Table VI. Examples 34 and 35 were tested separately in both nitric and sulfuric acid environments as discussed hereinabove in conjunction with the first series of examples. After four weeks neither compound had separated or blistered in either environment whereas Control C blistered in eight days.

TABLE VI

Adhesion of Polyamide Cured Fluoroelastomers to Various Substrates

| Ex. No. | Aluminum | Steel | Tin Plate | EPDM | Glass |
|---------|----------|-------|-----------|------|-------|
| 25 | Good | Excellent | Good | Good | Good |
| 26 | Excellent | Excellent | Good | Good | Best |
| 27 | Excellent | Excellent | Good | Good- Excellent |  |
| 28 | Excellent | Excellent | Good | Excellent | Excellent |
| 29 | Excellent | Excellent | Good | Excellent | Excellent |
| 30 | Excellent | Excellent | Good | Excellent | Excellent |
| 31 | Excellent | Good | Good | Good-Excellent | Excellent |
| 32 | Excellent | Good | Good | Excellent | Excellent |
| 33 | Good | Good-Excellent | Good | Excellent | Excellent |

Based upon the foregoing tests, Versamid 125 and 140 were found to be the best curatives although all of the members of the series formed better films than the DuPont control formulation, again the difference being primarily attributed to the lack of metallic oxides in the invention composition. Effective amounts of these curatives range from about 4.0 to 16.0 phr.

In the next series of tests, the epoxy group was introduced by first employing amine and amide adducts of epoxies. The amine adduct selected was D.E.H. 52 from Dow and the amide adducts included Versamid 230XB60 and Versamid 280B75 from Henkel Corp. Viton B and Viton 5362 were employed as the fluoroelastomers, in a 20% solids solution in MEK. Inasmuch as Viton 5362 was observed to form gas with D.E.H. 52, causing bubbles to appear in the films, three amine adducts were prepared. For Examples 43 and 44 TETA was mixed with two separate epoxies, D.E.N. 431 and EPON 1001. D.E.N. is a registered trademark of The Dow Chemical Co. for a series of epoxy novolac resins. The epoxy group was also added as the resin with an amine curative sufficient to cure the fluoroelastomer and epoxy. This data appears in the last six examples, 45–50, of Table VII wherein a mixture comprising eight parts of a 20% solution of TETA in MEK and 50 parts of a 20% solution of D.E.N. 431 in MEK was employed.

TABLE VII

Formulations of Viton Compounds and Amine Adducts of Epoxy Resins

| Ex. No. | Viton 5362 | Viton B | D.E.H. 52 | Versamid 230XB60 | Versamid 280B75 | TETA | Epoxy Compound | Gel Time (days) |
|---------|------------|---------|-----------|------------------|-----------------|------|----------------|-----------------|
| 36 | — | 100 | — | 2 | — | — | — | >2 |
| 37 | — | 100 | — | — | 1.5 | — | — | 1.5 hrs. |
| 38 | — | 100 | — | — | 1 | — | — | 2 hrs. |
| 39 | — | 100 | — | — | 1 | — | — | <1 |
| 40 | 100 | — | — | — | 1 | — | — | 2 hrs. |
| 41 | — | 100 | 2 | — | — | — | — | 4 |
| 42 | — | 100 | 4 | — | — | — | — | 3 |
| 43 | 25 | — | — | — | — | .07 | 5$^a$ | 6 hrs. |
| 44 | 25 | — | — | — | — | .03 | 5$^b$ | 2 hrs. |
| 45 | 25 | — | — | — | — | — | 5$^c$ | <1 |
| 46 | 25 | — | — | — | — | — | 10$^c$ | <1 |
| 47 | 25 | — | — | — | — | — | 15$^c$ | <1 |
| 48 | 25 | — | — | — | — | — | 25$^c$ | <1 |
| 49 | 100 | — | — | — | — | — | 10$^c$ | <1 |
| 50 | — | 100 | — | — | — | — | 40$^c$ | 3 hrs. |

$^a$D.E.N. 431
$^b$EPON 1001
$^c$TETA/D.E.N. 431 mixture 8:50 parts respectively In Table VIII, adhesion tests and gasohol immersion tests results are presented for several of the examples, the tests being conducted with baked films as described hereinabove. All the films were good except for Example 40 which had gas pockets. Example 50 was only subjected to nitric and sulfuric acid environment tests also described hereinabove. The film remained undamaged after four weeks of observation.

TABLE VIII

Adhesion of Table VII Films to Various Substrates

| Ex. No. | Adhesion of film with | | | Gasohol Immersion | |
|---|---|---|---|---|---|
| | Aluminum | Steel | Glass | Aluminum | Glass |
| 36 | Good | Good | — | — | — |
| 37 | a | a | — | — | — |
| 38 | Good | Good | — | — | — |
| 39 | — | — | — | Excellent | — |
| 40 | — | — | — | Excellent | — |
| 41 | Good | Good | — | — | — |
| 42 | Good | Good | — | — | — |
| 43 | Excellent | — | — | Excellent | — |
| 44 | Moderate | — | — | — | — |
| 45 | Excellent | — | Excellent | Acceptable[c] | Good |
| 46 | Excellent | — | Excellent | Acceptable[c] | Good |
| 47 | Excellent | — | Excellent | Acceptable[c] | Good |
| 48 | Good[b] | — | Excellent | Acceptable[c] | Good |
| 49 | Excellent | — | Excellent | Acceptable[c] | Good |

[a]Ex. 37 gelled too fast to be tested
[b]Film was brittle
[c]Peelable with difficulty Based upon the foregoing results, it is believed that D.E.H. 52 can be utilized with Viton B in amounts of from about 0.8 to 8.0 phr and with Viton 5362, in amounts ranging from about 0.1 to 1.0 utilizing a 10% solids solution of 5362 in MEK. The straight use of only Versamid 230XB60 or 280B75 is preferred with Viton B in amounts of about 0.1 to 10.0 phr and about 0.5 to 5.0 phr, respectively. The addition of approximately 10% Genamid 2000, fatty amidoamine resin, to either of the foregoing Versamids permits the use of Viton 5362 without gassing as is next established. Addition of epoxy resin can be made, as stated hereinabove, in almost any amount from 1 to 100 phr.

The fourth series of curatives evaluated therefore comprised blends of Genamid 2000 with Versamid 230XB60 and with Versamid 280B75. In each instance one part of the Genamid 2000 amidoamine was added to 14 parts of either the 230XB60 or 280B75 compound with 15 parts of MEK. These blends were employed as Curatives 1 and 2 utilized with Examples 51 to 67 in Table IX again using 20% solutions of Viton B or 5362 in MEK unless otherwise noted. Films formed were baked for adhesion tests, gasohol tests and acid environment tests, in the manner previously discussed, the results of which appear in Table X. Examples 65–67 were subjected to the nitric acid environment and were found to be intact after four weeks of exposure. For Examples 61–65, 25 parts of Viton solution was employed rather than 100 parts. Therefore, the phr of Curatives 1 and 2 employed can be obtained by multiplying the amounts presented in Table IX by a factor of four.

TABLE IX

Formulations of Viton Compounds with Genamid Curative Blends

| Ex. No. | Viton 5362 | Viton B | Curative 1 | Curative 2 | Gel Times (days) |
|---|---|---|---|---|---|
| 51 | — | 100 | 0.5 | — | <18 hrs. |
| 52 | — | 100 | 1.0 | — | <18 hrs. |
| 53 | 100 | — | 0.5 | — | 40 |
| 54 | 100 | — | 1.0 | — | 7 |
| 55 | 100 | — | 2.0 | — | 4 hrs. |
| 56 | — | 100 | — | 0.5 | 7 |
| 57 | — | 100 | — | 1.0 | 6 |
| 58 | 100 | — | — | 0.5 | 40 |
| 59 | 100 | — | — | 1.0 | 40 |
| 60 | 100 | — | — | 4.0 | 4 hrs. |
| 61 | 25[a] | — | 2.5 | — | 7 hrs. |
| 62 | 25[a] | — | — | 5.0 | 20 hrs. |
| 63 | 25[a] | — | — | 0.5 | b |
| 64 | 25[a] | — | — | 1.0 | c |
| 65 | 25[a] | — | 0.5 | — | b |
| 66 | — | 100 | 10 | — | 3 hrs. |
| 67 | — | 100 | — | 20 | 4 hrs. |

[a]About 26 additional parts of MEK added to the Viton to obtain 10% solid system
[b]No gelling observed
[c]Started to gel after 45 days

TABLE X

Adhesion of Table IX Films to Various Substrates

| Ex. No. | Adhesion of Films with | | | | | Gasohol Immersion |
|---|---|---|---|---|---|---|
| | Aluminum | Glass | EPDM | Nitrile | Neoprene | Aluminum |
| 50 | Good | — | — | — | — | — |
| 51 | Good | — | — | — | — | — |
| 52 | Good | — | — | — | — | — |
| 53 | Good | — | — | — | — | — |
| 54 | Good | — | — | — | — | — |
| 55 | Good | — | — | — | — | — |
| 56 | Good | — | — | — | — | — |
| 57 | Good | — | — | — | — | — |
| 58 | Good | — | — | — | — | — |
| 59 | Good | — | — | — | — | — |
| 60 | Excellent | Excellent | Excellent | Fair[a] | Fair[a] | — |
| 61 | Excellent | Excellent | Excellent | Good[a] | Good[a] | — |
| 62 | Excellent | — | — | — | — | Good[b] |
| 63 | Excellent | — | — | — | — | Good[b] |
| 64 | Excellent | — | — | — | — | Good[b] |

[a]Peelable
[b]Adhesion good after 14 days, but films were peelable

Based upon the foregoing results, it is believed that a blend of curatives, such as employed herein, can be utilized with both Viton B and 5362 without gassing. Effective levels of Curative 1 with either Viton range from about 0.5 to 10 phr and for Curative 2 range from about 0.5 to 20 phr.

Next, the addition of liquid and solid epoxy resins to a conventional fluoroelastomer composition containing a metallic oxide was conducted to determine the effect on adhesion between the resulting composition and aluminum or glass. Examples 68–77 which follow were prepared by utilizing combinations of masterbatches 1–7 presented in Table XI. All parts are presented by weight in grams.

TABLE XI

Viton and Epoxy Resin Masterbatches

| Masterbatch | Viton B | Maglite Y | MT Black | EPON 828 | EPON 1001 | H-3 | DIAK #3 | MEK |
|---|---|---|---|---|---|---|---|---|
| 1 | 17.37 | 2.61 | — | — | — | 0.50 | — | 100.00 |
| 2 | — | — | — | 13.00 | — | 7.0 | — | 100.00 |
| 3 | 14.82 | 2.22 | 2.96 | — | — | 0.50 | — | 100.00 |
| 4 | — | — | — | 13.00 | — | 7.0 | — | 100.00 |
| 5 | 100.00 | 15.00 | 15.00 | — | — | — | 2.0 | 442.00 |
| 6 | — | — | — | 13.00 | — | 7.0 | — | 100.00 |
| 7 | — | — | — | — | 50.00 | 10.0 | — | 100.00 |

In Table XII, combinations of the masterbatches of Table XI are reported. The solutions were utilized to coat aluminum, steel, tinplate or glass, as has been described hereinabove, by baking for one hour at 149° C. An indication of whether the film adhered or not to these substrates is reported in Table XIII. Gasohol immersion tests were again run with several of the examples on aluminum dishes, immersed for a period of four months.

TABLE XII

Viton and Epoxy Resin Masterbatch Combinations

| | Masterbatch No. and Amount | | | | | | |
|---|---|---|---|---|---|---|---|
| Ex. No. | 1 | 2 | 3 | 4 | 5 | 6 | 7 |
| 68 | 100 | — | — | — | — | — | — |
| 69 | 75 | 25 | — | — | — | — | — |
| 70 | 50 | 50 | — | — | — | — | — |
| 71 | 25 | 75 | — | — | — | — | — |
| 72 | — | — | 120 | 10 | — | — | — |
| 73 | — | — | 120 | 20 | — | — | — |
| 74 | — | — | 120 | 30 | — | — | — |
| 75 | — | — | — | — | 100 | — | — |
| 76 | — | — | — | — | 100 | 10 | — |
| 77 | — | — | — | — | 10 | — | 5 |

TABLE XIII

Adhesion of Table XII Films to Various Substrates

| Ex. No. | Aluminum | Steel | Tinplate | Glass | Gasohol Immersion Aluminum |
|---|---|---|---|---|---|
| 68 | No | — | — | No | — |
| 69 | Yes | — | — | Yes | — |
| 70 | Yes | — | — | Yes | — |
| 71 | Yes | — | — | Yes | — |
| 72 | Yes | Yes | Yes | Yes | Yes |
| 73 | Yes | Yes | Yes | Yes | Yes |
| 74 | Yes | Yes | Yes | Yes | Yes |
| 75 | No | No | — | — | — |
| 76 | Yes | Yes | — | — | — |
| 77 | Yes | Yes | — | — | — |

As can be seen from Table XIII, Examples 68 and 75 exhibited no adhesion. Examples 68 and 75 contained metallic oxides, and Example 75 also contained carbon black; neither film contained any epoxy resin. The other examples did contain the epoxy resin and were able to provide satisfactory adhesion despite the presence of metallic oxides. For purposes of comparison, reference can be made to Tables VII and VIII, Examples 43–50, wherein fluoroelastomer films containing epoxy resin, a curative and no metallic oxides were cast and tested and found to exhibit improved adhesion. Therefore, with the addition of the epoxy resin, the presence or absence of metallic oxides from the fluoroelastomer composition does not effect improved adhesion. For all other work discussed herein, it has been established and can therefore be concluded that metallic oxides must be deleted from the composition in order to obtain improved adhesion. With further respect to this latest data, effective amounts of epoxy resin to be added range from about 1 to 50 phr.

As stated hereinabove, the fluoroelastomers disclosed herein can also be adhered to various substrates by using two coatings, one containing the curative and a second containing only the fluoroelastomer. Until the two coatings are combined, curing does not commence.

In order to demonstrate operation under this method, Curatives 1 and 2 discussed hereinabove were employed for the first curative coat in Examples 78 and 79, respectively. The fluoroelastomer topcoat solution was prepared by combining 85 parts of Viton B; 15 parts of carbon black as a filler; and 500 parts of MEK.

For Examples 78 and 79, one side of two glass slides was given a coating of Curative 1 and Curative 2, respectively. These coatings were then air dried to remove the solvent following which each of the slides was then dipped into the fluoroelastomer solution, the uncoated sides receiving only the topcoat. The topcoat was then air dried and put into an oven for 15 minutes at 149° C. The fluoroelastomer films were then examined and it was observed that the film coating on the untreated side of glass was readily peelable, evidencing poor adhesion. The coating over Curative 1 was excellent and the coating over Curative 2 could only be peeled away with great difficulty.

The foregoing method is thus operable to coat substrates with fluoroelastomers, particularly in those instances where one wishes to apply only the fluoroelastomer coating, preferring not to work with curatives due to the fixed working life of fluoroelastomer-curative mixtures. As with the preceding work, it is believed that this method should also be practiced in the absence of metallic oxides so as not to interfere with adhesion. Again, it should be remembered that the amidoamine, Genamid 2000, is employed to avoid gassing. With polymers such as Viton B, where gassing does not occur, the amidoamine need not be incorporated into the curative coating.

As has been principally demonstrated herein, curing a conventional fluoroelastomer compound in the absence of metallic oxides provides films which have an unexpected increase in adhesion properties for various substrates. By employing the method of the present invention, it will be possible to coat cheaper substrate materials providing a fluoroelastomer exterior whereas heretofore only solid fluoroelastomer articles have been available. In other instances, substrates that are not necessarily inexpensive can be given a coating of the fluoroelastomer film in order to protect them from conditions such as oxidation, attack by chemical solvents and environments and protection from heat, to name a few.

The fluoroelastomer film compositions resulting from the method set forth herein are also believed to be novel, the films being unlike existing films which have contained metallic oxides and have not adhered well to any substrates. Furthermore, where metallic oxides are present, presence of an epoxy resin will provide other film compositions that can adhere to various substrates.

Lastly, the present invention will provide a plurality of novel useful articles which bear a coating or envelope of fluoroelastomer film. Many of these articles without the coating have had utility before, however, in certain environments their life has either been shortened or not possible. Reinforced hose for the transfer of gasoline, for instance, has been found to be short lived in gasohol. By coating at least the interior walls of conventional hose with the fluoroelastomer film of the present invention, degradation of the hose can be forestalled, thereby increasing its life.

Many other types of tubing or hose as well as ductwork could be coated to provide chemical resistance. Larger vessels such as tanks could also be coated. Still other uses to which the fluoroelastomer coatings of the present invention could be put include pump diaphragms; O-ring cord stock; gaskets; fabricated seals and expansion joints; coated fabrics for small uses as in safety apparel to others as large as tents or buildings; foams, such as reticulated urethanes to be placed in fuel tanks, or others to be used as chemical filters; various electrical purposes such as transformers, conductive films, solar panels and appliances; heat shields; printing blankets; cable and wire coatings and even as adhesives. More generally, substantially any surface that can tolerate a thin coating can be protected by the fluoroelastomer compositions of the present invention.

Based upon the foregoing results, it is believed that the methods, compositions and coated articles of the present invention accomplish the objects set forth hereinabove. By employing solvent systems of the fluoroelastomer gum and an amine-derived curative, good dense films, generally impermeable to chemical attack, and forming a strong bond with underlying substrates can be obtained.

It is to be understood that the specific composition of fluoroelastomer gum selected is not necessarily critical to meeting the objects of the present invention. It should be apparent to those skilled in the art that other fluoroelastomers could be utilized in lieu of those exemplified and disclosed herein. Similarly, other amine-derived curatives or curative systems could also be employed. The present invention is not specifically directed to the use of the curatives specified herein inasmuch as they are generally known and have been described elsewhere for their curative properties. While they are necessary to cure the fluoroelastomers with which they are employed, their selection herein has been to demonstrate the fluoroelastomer film coatings can be prepared in the absence of metallic oxides which will adhere well to various substrates. Thus, the substitution of other curatives should not affect practice of the invention set forth herein.

It is therefore to be understood that variations of the disclosure fall within the scope of the claimed invention and that the subject invention is not to be limited by the examples set forth herein. They have been provided merely to provide a demonstration of operability and therefore the selection of suitable fluoroelastomers and curatives can be determined without departing from the spirit of the invention herein disclosed and described. Moreover, the scope of the invention shall include all modifications and variations that fall within the scope of the attached claims.

I claim:

1. A method for coating a substrate with fluoroelastomer film including the steps of:
    coating the substrate with a film of an amine-derived curative selected from the group consisting of polyamine and polyamide adducts of epoxy resins, and blends of fatty amidoamine resins with polyamide adducts of epoxy resins;
    applying a fluoroelastomer gum solution to said curative coated substrate; and
    evaporating the solvent from said solution sufficiently to leave the film adhered to said curative coated substrate.

2. A method as set forth in claim 1, wherein said step of coating the substrate with a curative includes the step of dissolving said curative in a solvent and said step of applying a fluoroelastomer gum solution includes the step of dissolving a fluoroelastomer gum selected from the group consisting of copolymers of vinylidene fluoride and hexafluoropropylene, and terpolymers of vinylidene fluoride, hexafluoropropylene and tetrafluoroethylene, in a solvent.

3. A method as set forth in claim 2, wherein said curative comprises polyamide adducts of epoxy resins.

4. A method as set forth in claim 2, wherein said curative comprises blends of fatty amidoamine resins.

5. A method as set forth in claim 1, including the additional step of baking said film at a temperature of at least 100° C. after the step of evaporating said solvent.

* * * * *